US008738382B1

(12) United States Patent
Herz

(10) Patent No.: US 8,738,382 B1
(45) Date of Patent: May 27, 2014

(54) AUDIO FEEDBACK TIME SHIFT FILTER SYSTEM AND METHOD

(75) Inventor: William Samuel Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 949 days.

(21) Appl. No.: 11/303,556

(22) Filed: Dec. 16, 2005

(51) Int. Cl.
*G10L 15/00* (2013.01)
*G10L 21/00* (2013.01)
*G10L 25/00* (2013.01)
*G06F 3/16* (2006.01)
*G10L 15/20* (2006.01)
*G10L 15/22* (2006.01)

(52) U.S. Cl.
CPC ............... *G06F 3/167* (2013.01); *G10L 15/20* (2013.01); *G10L 15/22* (2013.01)
USPC .......................................... 704/275; 704/233

(58) Field of Classification Search
CPC .......... G10L 15/22; G10L 15/20; G06F 3/167
USPC ........................................ 704/270, 275, 233
See application file for complete search history.

(56) References Cited

U.S. PATENT DOCUMENTS

| | | | | |
|---|---|---|---|---|
| 5,136,559 | A | * | 8/1992 | Nakayama .................. 369/44.11 |
| 5,305,307 | A | * | 4/1994 | Chu .............................. 370/288 |
| 5,561,668 | A | * | 10/1996 | Genter .......................... 370/288 |
| 5,568,558 | A | * | 10/1996 | Ramm et al. .................. 381/94.4 |
| 5,911,124 | A | * | 6/1999 | Doran ........................... 455/570 |
| 6,061,456 | A | * | 5/2000 | Andrea et al. ................ 381/71.6 |
| 6,091,813 | A | * | 7/2000 | Harley et al. ............ 379/406.08 |
| 6,181,753 | B1 | * | 1/2001 | Takada et al. .................. 375/346 |
| 6,389,440 | B1 | * | 5/2002 | Lewis et al. .................... 708/322 |
| 6,526,139 | B1 | * | 2/2003 | Rousell et al. ........... 379/406.03 |
| 6,741,185 | B2 | * | 5/2004 | Shi et al. ..................... 340/853.2 |
| 6,889,191 | B2 | * | 5/2005 | Rodriguez et al. ............. 704/275 |
| 7,324,947 | B2 | * | 1/2008 | Jordan et al. .................. 704/275 |
| 7,548,852 | B2 | * | 6/2009 | Den Brinker et al. ......... 704/219 |
| 7,876,996 | B1 | * | 1/2011 | Herz ............................. 386/203 |

(Continued)

OTHER PUBLICATIONS

Herbordtt, W.; Nakamura, S.; Kellermann, W., "Joint optimization of LCMV beamforming and acoustic echo cancellation for automatic speech recognition," Acoustics, Speech, and Signal Processing, 2005. Proceedings. (ICASSP '05). IEEE International Conference on, vol. 3, No., pp. iii/77-iii/80 vol. 3, Mar. 18-23, 2005.*

(Continued)

*Primary Examiner* — Douglas Godbold
*Assistant Examiner* — Michael Ortiz Sanchez

(57) ABSTRACT

Audio feedback time shifted filtering systems and methods are presented. The systems and methods facilitate separation of program audio feedback from received environmental audio (e.g., audio sensed by a microphone.) The separation of the program audio feedback reduces interference from program content audio feedback on performance of voice recognition operations. In one embodiment of a personal video recorder audio filter method, environmental audio patterns are received, an audio feedback time shift filter process is executed for separating out program content from the environmental audio patterns, and voice recognition is performed on the filtered environment audio patterns (without interference from program audio content feedback). The time shift or deterministic delay provides a closer correlation between program audio content and program audio content feedback received at the microphone and permits input timing compensation to compensate for feedback loop delays.

13 Claims, 3 Drawing Sheets

(56) References Cited

U.S. PATENT DOCUMENTS

| | | | | |
|---|---|---|---|---|
| 2001/0029449 | A1* | 10/2001 | Tsurufuji et al. | 704/226 |
| 2002/0180613 | A1* | 12/2002 | Shi et al. | 340/853.1 |
| 2003/0040903 | A1* | 2/2003 | Gerson | 704/211 |
| 2003/0105637 | A1* | 6/2003 | Rodriguez et al. | 704/270 |
| 2005/0008143 | A1* | 1/2005 | Lang et al. | 379/406.1 |
| 2005/0086058 | A1* | 4/2005 | Lemelson et al. | 704/270 |
| 2005/0114141 | A1* | 5/2005 | Grody | 704/270 |
| 2007/0047731 | A1* | 3/2007 | Lipari | 379/406.01 |
| 2007/0116254 | A1* | 5/2007 | Looney et al. | 379/406.01 |
| 2008/0201138 | A1* | 8/2008 | Visser et al. | 704/227 |

OTHER PUBLICATIONS

Harrison, W.; Jae Lim; Singer, E., "A new application of adaptive noise cancellation," Acoustics, Speech and Signal Processing, IEEE Transactions on , vol. 34, No. 1, pp. 21-27, Feb 1986.*

Miksic, Andrej / Horvat, Bogomir (1997): "Subband echo cancellation in automatic speech dialog systems", In EUROSPEECH-1997, 2579-2582.*

W. Herbordt and W. Kellermann, "Frequency-domain integration of acoustic echo cancellation and a generalized sidelobe canceller with improved robustness," European Trans. on Telecommunications, vol. 13, No. 2, pp. 123-132, 2002.*

* cited by examiner

200

210

RECEIVING ENVIRONMENTAL AUDIO PATTERNS.

220

EXECUTING AN AUDIO FEEDBACK TIME SHIFT FILTER PROCESS.

230

PERFORMING VOICE RECOGNITION ON THE FILTERED ENVIRONMENT AUDIO PATTERNS.

TRACKING PROGRAM CONTENT AUDIO.

320

DELAYING SAID PROGRAM CONTENT AUDIO.

330

FILTERING SAID DELAYED PROGRAM CONTENT AUDIO FROM SAID SENSED ENVIRONMENT AUDIO PATTERNS.

FIG. 3

AUDIO FEEDBACK TIME SHIFT FILTER SYSTEM AND METHOD

FIELD OF THE INVENTION

The present invention relates to the field of vocal command processing. More particularly the present invention relates to a personal video recorder audio feedback "time shift" filter system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. A number of these activities involve responding to user commands. Systems that permit utilization of vocal commands require the commands to be discernible and differentiating commands from other environmental audio noise and interference can be problematic, especially distinguishing audio program content from user commands.

Numerous electronic devices include systems that emit audio sounds. These systems typically provide a number of advantageous benefits, including enhanced user experience. Program audio content, such as music, can be very pleasing by itself. Alternatively, program audio content can also be presented in conjunction with visual information. For example, audio content in television programs or video games often includes sound effects for complementing visual presentations and enhancing user emersion in the activity. These and other audio systems are often controlled by user commands or directions.

Systems that respond to user audio commands often offer a number of potential advantageous benefits. Users usually find issuing vocal commands convenient and a familiar technique to communicate instructions. In addition, vocal commands are often intuitive and easy to comprehend. For example, if a user wants a device such as a personal video recorder to cease an activity or operation the user says the word "stop". Vocal command recognition systems often reduce the need for arduous input by hand and can free up hands for relaxation or other activities such as controlling a game console joystick with minimal interruption for generic system control input. However, many systems that include features for emitting audio program content while also attempting to utilize vocal command recognition often encounter audio feedback that can cause problems.

One difficulty in using voice recognition technology to control video and audio systems is the audio feedback from the video or audio system. For example, if a CD is playing a song and the song includes the lyric "stop" that is picked up by the voice recognition of the control system, the control system could potentially misinterpret the lyric "stop" as a user command and stop the CD playing. In addition, the audio feedback can produce more generic interference that makes proper interpretation of user commands more difficult. For example, generic audio interference can introduce additional audio signals that interfere with vocal user command signals making it difficult for a voice recognition algorithm to properly distinguish the user commands.

SUMMARY

Audio feedback time shifted filtering systems and methods are presented. The systems and methods facilitate separation of program audio feedback from received environmental audio (e.g., audio sensed by a microphone.) The separation of the program audio feedback reduces interference from program content audio feedback on performance of voice recognition operations. In one embodiment of a personal video recorder audio filter method, environmental audio patterns are received (e.g., at a microphone), an audio feedback time shift filter process is executed for separating out program content feedback from the environmental audio pattern, and voice recognition is performed on the filtered environment audio patterns (e.g., without interference from program audio content feedback). The audio feedback time shift filter process filters or separates out program content audio feedback from the received environmental audio patterns in accordance with a deterministic delay. The time shift or deterministic delay provides a closer correlation between program audio content and program audio content feedback received at the microphone and permits input timing compensation to compensate for feedback loop delays.

In one exemplary implementation, the audio feedback time shift filter process comprises tracking program content audio, synchronizing the tracking of the program content audio to correspond with program content audio feedback input, and separating the corresponding program content audio feedback from the sensed environment audio patterns. A deterministic delay is utilized to perform the synchronization. In one exemplary implementation the deterministic delay is equal to the feedback time period including a time sufficient for program content audio to be emitted and sensed in a feed back loop. Control command audio patterns in the filtered environment audio patterns are identified and corresponding control command instructions are implemented. The filtering and deterministic input timing compensation delay stops false commands (e.g., through subtraction) even when commands are not being issued.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 2 is a flow chart of an exemplary personal video recorder audio filter method in accordance with one embodiment of the present invention.

FIG. 3 is a flow chart of an exemplary audio feedback time shift filter process in accordance with one embodiment of the present invention.

DETAILED DESCRIPTION

Figure 1:
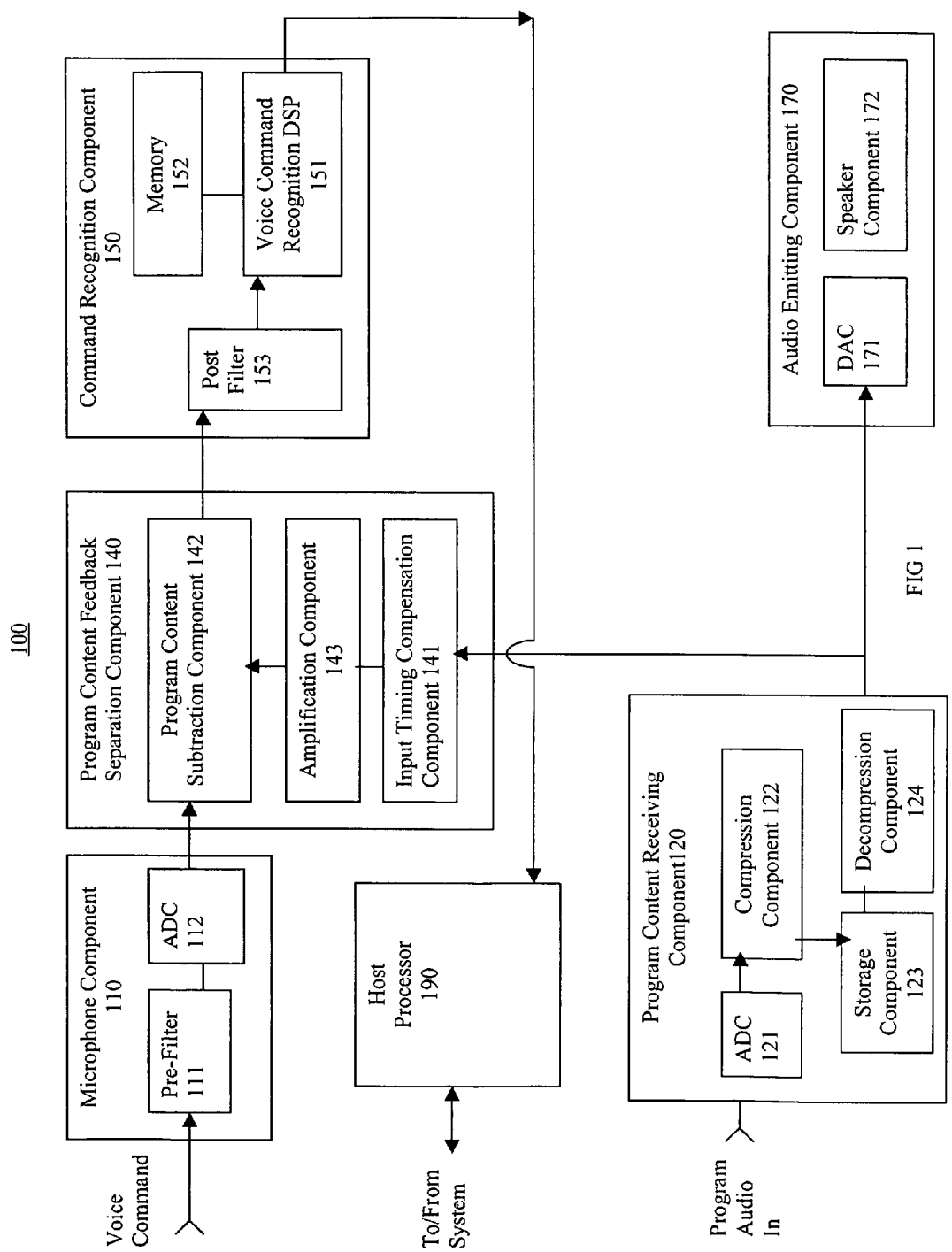
FIG. 1 is a block diagram of an exemplary personal video recorder command recognition system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions, which follow, are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention facilitates efficient and accurate filtering or separation of program audio content and environmental audio (e.g., user audio picked up by a microphone at the point of command). In one embodiment, the present invention synchronizes program content filtering to compensate for deterministic delays in reception of emitted program content feedback. In one exemplary implementation, the present invention prevents program content feedback from being misinterpreted as a vocal user control command. The following descriptions of time shifted program content feedback filtering are presented as part of exemplary personal video recorder implementations. It is appreciated the present invention is readily adaptable to a variety of other systems that include program content tracking capabilities (e.g. computer systems, game consoles, etc).

FIG. 1 is a block diagram of exemplary personal video recorder command recognition system 100, in accordance with one embodiment of the present invention. Personal video recorder command recognition system 100 includes microphone component 110, program content receiving component 120, program content feedback separation component 140, command recognition component 150, and audio emitting component 170. Microphone component 110 is communicatively coupled with program content feedback separation component 140 which is communicatively coupled with command recognition component 150. Program content feedback separation component 140 is also communicatively coupled with program content receiving component 120 and audio emitting component 170.

The components of personal video recorder command recognition system 100 cooperatively operate to perform program content presentation with feedback filtering for facilitating vocal command recognition. Microphone component 110 receives environmental audio patterns including program content audio feedback patterns. Program content receiving component 120 receives program content information. Audio emitting component 170 emits (e.g., "annunciates") the program audio content. Program content feedback separation component 140 removes or separates the feedback program content audio patterns from the detected environmental audio patterns. In one embodiment of the present invention, program content feedback separation component includes time "shifts" or deterministic delay adjustments to compensate for feedback time delays (e.g., of input information sensed at a microphone). The program content feedback separation component also effectively stops false commands (e.g., through subtraction) even when user commands are not being issued. Command recognition component 150 recognizes audio commands in the environmental audio patterns after the removal of the feedback program content audio patterns.

In one embodiment, program content feedback separation component 140 includes program input timing compensation component 141 and program content subtraction component 142. Program input timing compensation component 141 "time shifts" the un-annunciated program content information to be in proper timing synchronization for subtraction from received environmental audio signals. In one exemplary implementation, program input timing compensation component 141 deterministically delays or stores the program content audio patterns for a period of time equal to the time audio emitting component 170 takes to emit processed program content and program content feedback separation component 140 to receive the emitted program content as feedback from microphone component 110. For example, if program content input information includes the word "stop", program input timing compensation component 141 stores the word "stop" long enough for the word to be emitted by speaker component 170 and received by microphone component 110. When microphone component 110 forwards the received word (e.g., "stop") to program content subtraction component 142, the input program timing compensation component 141 also forwards the corresponding "delayed" program content information to program content subtraction component 142.

Program content subtraction component 142 subtracts the "time shifted" or deterministically delayed program content audio patterns from the sensed environmental audio patterns (e.g., picked up by a microphone). For example, the program content subtraction component 142 receives a "time shifted" or deterministically delayed word (e.g., stop) from timing compensation component 141 and "subtracts" the word from the sensed environmental audio signals received from microphone component 110. Thus, program content information emitted by speaker component 170 and sensed in a "feedback" loop by microphone component 110 is prevented from being forwarded to command recognition component 150 and misinterpreted as a user command. Program content compensation component 140 also includes amplification component 143 for amplifying the received annunciated program audio patterns.

In one embodiment, command recognition component 150 includes memory 152 and voice command recognition DSP 151 and post filter 153. Memory 152 stores a table mapping commands to voice patterns. Voice command recognition DSP 151 compares incoming audio patterns to command information from memory 152 and issues a corresponding command if there is a match. In one embodiment the command is forwarded to host processor 190. Post filter 153 filters other interference or noise from the information.

Program content receiving component 120 includes an analog to digital conversion component 121, compression component 122, storage component 123 and decompression component 124, in one embodiment of the present invention. Conversion component 121 converts analog signals conveying program content information to digital signals. Compression component 122 compresses the program content information (e.g., for more efficient storage). Storage component 123 stores the compressed program content information. Decompression component 124 decompresses the compressed program content information and forwards the decompressed version of the program content information (e.g., to program content feedback separation component 140 and audio emitting component 170). In one exemplary implementation, content is delivered to the system already compressed and is sent to storage component 123 and decompression component 124 bypassing analog to digital conversion component 121 and compression component 122.

In one embodiment audio emitting component 170 includes digital to analog converter 171 and speaker 172. Digital to analog converter 171 converts digital signals to analog signals and forwards the analog signals to speaker 172. Speaker 172 emits program audio content as sound waves.

In one exemplary implementation, microphone component 110 includes pre-filter 111 and analog to digital conversion component 112. Pre-filter 111 filters received environmental analog signals to remove interference and noise. In one exemplary implementation, pre-filter 111 also narrows a user's vocal commands to just the voice signal and not ambient sound (frequencies). Analog to digital conversion component 112 converts the filtered analog signals to digital signals. The digital signals are forwarded to the program content feedback separation component 140 for separation or removal of the feedback program content audio patterns from the environmental audio patterns.

FIG. 2 is a flow chart of exemplary personal video recorder (PVR) audio filter method 200 in accordance with one embodiment of the present invention. Personal video recorder audio filter method 200 facilitates separation of program audio from audio from a microphone at a point of command. The PVR audio filter method 200 also facilitates accurate voice recognition in a personal video recorder system. In one exemplary implementation, interference from program content feedback is reduced and misinterpretation of user vocal commands is prevented. It is appreciated that personal video recorder audio filter method 200 can be readily adapted for use in a variety of other entertainment systems.

In step 210, environmental audio patterns are received. In one embodiment of the present invention, the sensed audio patterns include feedback of emitted or annunciated program content. For example, the sensed environmental audio patterns can include words or lyrics from a television program, song, video game, etc. The environmental audio patterns are received by a microphone in one exemplary implementation.

In step 220, an audio feedback time shift filter process is performed. In one exemplary implementation, the audio feedback time shift filter process includes a deterministic delay for facilitating correlation of program audio content feedback at the time of vocal user input (e.g., a vocal user command) Program content audio feedback is filtered from the received environmental audio patterns. The filtered program content is time shifted for a deterministic delay to correspond with feedback loop delays. The audio feedback time shift filter process facilitates minimization of interference from program content audio feedback on performance of voice recognition operations.

In step 230 voice recognition is performed on the filtered environment audio patterns. Control command audio patterns in the filtered environment audio patterns are distinguished or identified. In one embodiment, the corresponding control command instructions are implemented. It is appreciated the control commands can direct a variety of system operations, including stopping an activity, changing a content channel, returning to a previous activity, pausing an activity, changing an audio volume, etc.

FIG. 3 is a flow chart of audio feedback time shift filter process 300 in accordance with one embodiment of the present invention. In one exemplary implementation, audio feedback time shift filter process 300 is executed in step 220 of personal video recorder audio filter method 200.

In step 310, program content audio is tracked. In one embodiment, the tracked program content is the same as emitted program content audio. For example, the program content can include words or lyrics from a television program, song, video game, etc. In one exemplary implementation, the tracked audio patterns include words or lyrics including commands.

In step 320, the program content audio is delayed. The delay can be for a deterministic "feedback time period" such as a time sufficient for program content audio to be emitted and sensed in a feed back loop. In one exemplary implementation, the feedback time period can be varied by a user. For example, the pro In step 330, the delayed program content audio is filtered from the received environmental audio patterns. For example, delayed program content signals are "subtracted" from received environmental audio signals. In one exemplary implementation, amplitudes of the program content and/or received environmental audio patterns are adjusted to facilitate accurate filtering.

In one embodiment of the present invention, filtering to remove background noise and/or interference is also performed. For example, in addition to filtering program content feedback other back ground noise can be filtered. It is appreciated the present invention is readily adaptable for filtering a variety of different background noises including air conditioner noise, fan noise, and/or other appliances emitting noises in the system environment.

Thus, the present invention facilitates enhanced user interaction experience by efficiently reducing the possibility of program content being confused with user commands. Present invention time shifted program content feedback filtering enables a system to distinguish between user vocal commands and program content. Time shifting of the program content filtering provides accurate removal of the program content from voice recognition processes while permitting continued processing of user vocal commands.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A personal video recorder audio filter method comprising:
   receiving program content at a program content receiving component that forwards the program content to a program content feedback separator and to an audio emitter;
   receiving environmental audio patterns at a microphone wherein, upon an annunciation of the received program content by the audio emitter, the received environmental audio patterns comprise a feedback of an annunciated instance of the program content and wherein the received audio patterns are forwarded to the program content feedback separator;
   separating a component of a portion of the received program content from a corresponding portion of the received environmental audio patterns, wherein the separating comprises:
   compensating for a delay between the feedback of a portion of the annunciated program content instance and by time shifting a stored un-annunciated instance of the program content portion;
   subtracting information corresponding to the time shifted un-annunciated program content portion component from the received environmental audio patterns; and
   adjusting an amplitude of the program content;
   performing voice recognition on a remainder of the environment audio patterns after the subtraction, wherein the voice recognition is performed independent of the subtracted program content portion; and
   upon detecting, based on the performing the voice recognition, that the remainder environment audio patterns comprise at least one control command related audio pattern, executing one or more control commands corresponding to the control command related audio pattern;
   wherein said program content feedback separation component stops one or more false commands, which correspond to at least an element of said program content, when user commands are not being issued.

2. A personal video recorder audio filter method of claim 1 wherein said method facilitates minimization of interference from program content audio feedback on performance of said voice recognition.

3. A personal video recorder audio filter method of claim 1 wherein a delay associated with said separating is tapped into an existing personal video time shift buffer and is user variable.

4. A personal video recorder audio filter method of claim 1 wherein said separating time shifts said filtered program content to compensate for a feedback loop delay.

5. A personal video recorder audio filter method of claim 1 wherein said separating comprises:
   tracking program content audio; and
   synchronizing said tracking of said program content audio to correspond with program audio content input feedback, wherein a is utilized to perform said synchronizing.

6. A personal video recorder audio filter method of claim 5 wherein said delay of said program content audio comprises a deterministic feedback time period.

7. A personal video recorder audio filter method of claim 6 wherein said deterministic feedback time period includes a time sufficient for program content audio to be emitted and sensed in a feed back loop.

8. A personal video recorder command recognition system comprising:
   a program content receiving component operable for receiving a program content input;
   a microphone component operable for receiving environmental audio patterns,
   wherein the environmental audio patterns comprise a feedback of an annunciated instance of the program content upon an annunciation of a portion thereof;
   an audio emitting component coupled to the program content receiving component and operable for annunciating the annunciation of the program content;
   a program content feedback separation component coupled to the microphone component, and to the program content receiving component, and operable for separating the program content from the received environmental audio patterns, wherein the program content feedback compensation component comprises:
   an input timing compensator operable for compensating for a delay between the feedback of a portion of the annunciated program content instance and by time shifting a stored un-annunciated instance of the program content portion;
   a program content subtractor operable for subtracting information corresponding to the time shifted un-annunciated program content portion component from the received environmental audio patterns; and
   an amplifier operable for amplifying the program content, wherein the amplifying comprises adjusting an amplitude of the program content to facilitate an accurate filtering;
   a command recognition component coupled to the program content feedback separation component and operable for recognizing audio commands in a remainder of the environment audio patterns after the subtraction of the program content portion therefrom;
   wherein the command recognition component comprises:
   a memory for storing a table mapping to commands to voice patterns; and
   a voice command recognizer operable for recognizing the voice patterns; and
   a command implementing component coupled to the command recognition component and operable for implementing corresponding control command instructions;
   wherein, upon the annunciation of the program content portion by the audio emitting component, the program content portion is sensed in a feedback loop by the microphone component and is deterred from being forwarded to the command recognition component and prevented from being misinterpreted as a user command and wherein the command recognition component stops one or more false commands, which correspond to at least an element of the program content, when user commands are not being issued.

9. A personal video recorder command recognition system of claim 8 wherein said input timing compensator delays said program content audio patterns over said second time period, during which said program content feedback compensation component is further operable for receiving said annunciated program content from said microphone component as an audio feedback input.

10. A personal video recorder command recognition system comprising:
    means for receiving program content at a program content receiving component that forwards the program content to a means for separating program content feedback and to a means for emitting audio;

means for receiving environmental audio patterns at a microphone wherein, upon an annunciation of the received program content by the audio emitting means, the received environmental audio patterns comprise a feedback of an annunciated instance of the program content and wherein the received audio patterns are forwarded to the means for separating the program content feedback;

the means for separating a component of a portion of the received program content from a corresponding portion of the received environmental audio patterns, wherein the separating means comprises:

means for compensating for a delay between the feedback of a portion of the annunciated program content instance and by time shifting a stored un-annunciated instance of the program content portion;

means for subtracting information corresponding to the time shifted un-annunciated program content portion component from the received environmental audio patterns; and means for adjusting an amplitude of the program content;

means for performing voice recognition on a remainder of the environment audio patterns after the subtraction, wherein the voice recognition is performed independent of the subtracted portion; and means for executing, based on a detection by the means for performing the voice recognition, that the remainder environment audio patterns comprise at least one control command related audio pattern, one or more control commands corresponding to the control command related audio pattern;

wherein said subtraction means functions to stop one or more false commands, which correspond to at least an element of said program audio information, when user commands are not being issued.

11. A personal video recorder command recognition system of claim 10 wherein said means for separating comprises means for tracking an un-annunciated version of said program audio information over said first time period to allow an annunciated version of said program audio information to be sensed.

12. A personal video recorder command recognition system of claim 10 further comprising:
a means for mapping voice patterns to instructions; and
a means for recognizing said voice patterns in said annunciated version of said program audio information.

13. A personal video recorder command recognition system of claim 10 wherein an un-annunciated version of program audio information is received in a compressed digitized format that is decompressed by said means for receiving said program content.

* * * * *